(12) United States Patent
Wisnewski et al.

(10) Patent No.: US 9,731,603 B2
(45) Date of Patent: Aug. 15, 2017

(54) ELECTRIC AND HYBRID VEHICLE HIGH CURRENT CONDUCTOR

(75) Inventors: Mark A. Wisnewski, Stockbridge, MI (US); David J. Trzcinski, Howell, MI (US); William C. Goodwin, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1051 days.

(21) Appl. No.: 13/450,645

(22) Filed: Apr. 19, 2012

(65) Prior Publication Data
US 2013/0278051 A1 Oct. 24, 2013

(51) Int. Cl.
| | |
|---|---|
| *H04B 3/54* | (2006.01) |
| *B60L 1/00* | (2006.01) |
| *H01B 7/30* | (2006.01) |
| *B60L 7/14* | (2006.01) |
| *B60L 11/14* | (2006.01) |
| *B60L 11/18* | (2006.01) |
| *B60L 15/20* | (2006.01) |
| *H01B 7/08* | (2006.01) |
| *H01B 9/00* | (2006.01) |

(52) U.S. Cl.
CPC .......... *B60L 1/003* (2013.01); *B60L 7/14* (2013.01); *B60L 11/14* (2013.01); *B60L 11/1803* (2013.01); *B60L 11/1861* (2013.01); *B60L 11/1864* (2013.01); *B60L 15/2009* (2013.01); *H01B 7/30* (2013.01); *B60L 2210/40* (2013.01); *B60L 2220/14* (2013.01); *B60L 2240/34* (2013.01); *B60L 2240/423* (2013.01); *H01B 7/08* (2013.01); *H01B 9/006* (2013.01); *Y02T 10/645* (2013.01); *Y02T 10/70* (2013.01); *Y02T 10/7005* (2013.01); *Y02T 10/7044* (2013.01); *Y02T 10/7061* (2013.01); *Y02T 10/7077* (2013.01); *Y02T 10/7241* (2013.01); *Y02T 10/7275* (2013.01)

(58) Field of Classification Search
USPC ........................................ 307/147
See application file for complete search history.

(56) References Cited

U.S. PATENT DOCUMENTS

| | | | |
|---|---|---|---|
| 2,769,148 A | 10/1956 | Clogston | |
| 2,769,150 A | 10/1956 | Black et al. | |
| 2,797,393 A * | 6/1957 | Clogston | B01J 39/02 174/126.1 |
| 2,799,006 A | 7/1957 | Edson | |
| 5,579,217 A * | 11/1996 | Deam | H01L 23/52 174/72 B |

(Continued)

OTHER PUBLICATIONS

E. F. Vaage, Transmission Properties of Laminated Clogston Type Conductors, The Bell System Technical Journal, May 1953, pp. 695-713.

*Primary Examiner* — Jared Fureman
*Assistant Examiner* — Emmanuel R Dominique (57) ABSTRACT

An apparatus for transferring electrical current between a first component and a second component includes at least one transfer conductor directing electrical current between the first and second components including a plurality of overlapping conducting layers each arranged in parallel with the directed electrical current and a plurality of insulation layers each disposed between alternating ones of the conducting layers.

13 Claims, 4 Drawing Sheets

(56) References Cited

U.S. PATENT DOCUMENTS

| | | | | |
|---|---|---|---|---|
| 6,107,577 | A * | 8/2000 | Sexton | G02B 6/4403 |
| | | | | 174/117 A |
| 6,148,221 | A * | 11/2000 | Ishikawa | H01L 39/128 |
| | | | | 257/E39.011 |
| 7,633,356 | B2 * | 12/2009 | Hamet | H01Q 1/364 |
| | | | | 333/156 |
| 2001/0022233 | A1 * | 9/2001 | Takada | B60R 16/0207 |
| | | | | 174/72 A |
| 2003/0090160 | A1 * | 5/2003 | Murakami | H02G 5/005 |
| | | | | 307/147 |
| 2003/0117025 | A1 * | 6/2003 | Rouquette | G01V 1/201 |
| | | | | 307/147 |
| 2003/0226685 | A1 * | 12/2003 | Murakami | H01L 23/5383 |
| | | | | 174/117 F |
| 2006/0071860 | A1 * | 4/2006 | Hozoji | H01L 24/36 |
| | | | | 343/700 MS |
| 2006/0207779 | A1 * | 9/2006 | Sexton | H01B 7/0216 |
| | | | | 174/36 |
| 2008/0049476 | A1 * | 2/2008 | Azuma | B60L 3/12 |
| | | | | 363/131 |
| 2008/0066957 | A1 * | 3/2008 | Hsu | H02G 3/22 |
| | | | | 174/650 |
| 2011/0298640 | A1 * | 12/2011 | Tate, Jr. | B60L 3/12 |
| | | | | 340/995.1 |
| 2013/0255991 | A1 * | 10/2013 | Snitchler | H01B 12/02 |
| | | | | 174/113 C |
| 2014/0376132 | A1 * | 12/2014 | Carter | H02G 15/34 |
| | | | | 361/4 |

* cited by examiner

ELECTRIC AND HYBRID VEHICLE HIGH CURRENT CONDUCTOR

TECHNICAL FIELD

This disclosure is related to high electric current conductors in electric and hybrid vehicles.

BACKGROUND

The statements in this section merely provide background information related to the present disclosure. Accordingly, such statements are not intended to constitute an admission of prior art.

Electric and hybrid electric vehicles often use sources of high voltage such as battery packs or fuel cells that deliver direct current (DC) to drive vehicle motors, electric traction systems, and other vehicle systems. These systems typically include power inverters to convert the DC input from the power source to a 3-phase alternating current (AC) output compatible with electric motors and electric components. The 3-phase AC output is typically distributed via 3-phase conductors to drive vehicle motors, electric traction systems and other vehicle systems.

It is known for a skin effect to occur when AC is transmitted over various conductors within electric and hybrid electric systems. The skin effect is a phenomenon wherein the AC has the tendency to crowd toward the surface of the conductor. The depth of penetration of the current can be referred to as the skin depth. The occurrence of skin effect undesirably increases the resistance to AC current flowing through the conductor.

SUMMARY

An apparatus for transferring electrical current between a first component and a second component includes at least one transfer conductor directing electrical current between the first and second components including a plurality of overlapping conducting layers each arranged in parallel with the directed electrical current and a plurality of insulation layers each disposed between alternating ones of the conducting layers.

DETAILED DESCRIPTION

Figure 1:
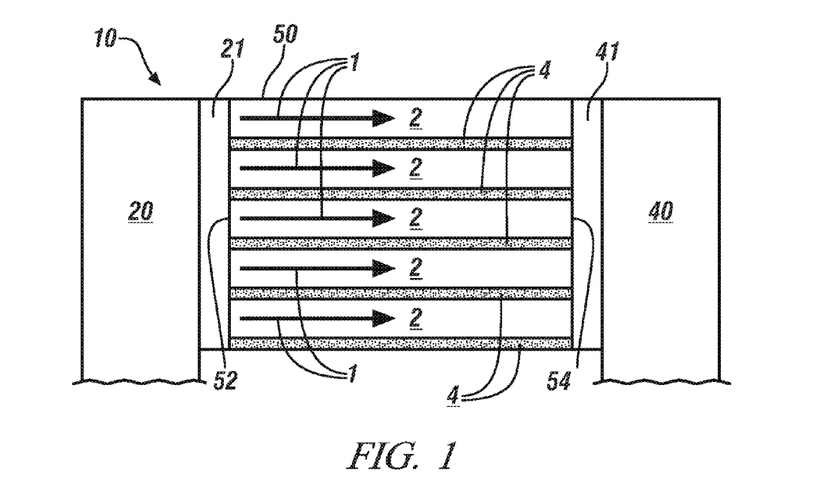
FIG. 1 illustrates a partial sectional view through an exemplary high current conducting apparatus including a first transfer conductor directing electric current in a first direction from a first component to a second component in accordance with the present disclosure.

Referring now to the drawings, wherein the showings are for the purpose of illustrating certain exemplary embodiments only and not for the purpose of limiting the same, FIG. 1 illustrates a partial sectional view through an exemplary high current conducting apparatus 10 for transferring electrical current between a first component 20 and a second component 40. The apparatus 10 includes a first transfer conductor 50 directing electrical current in a first direction 1 from the first component 20 to the second component 40. The first transfer conductor 50 includes a plurality of overlapping conducting layers 2 each arranged in parallel with the directed electrical current in the first direction 1. The first transfer conductor 50 further includes a plurality of insulation layers 4 each disposed between alternating ones of the conducting layers 2. As will become apparent, current density over the entire cross section of each of the conducting layers 2 is substantially uniform and the directed electrical current in the first direction 1 is evenly distributed across each of the conducting layers 2.

A first end 52 of the first transfer conductor 50 is electrically coupled to a first terminal 21 of the first component 20. A second end 54 of the first transfer conductor 50 is electrically coupled to a first terminal 41 of the second component 40. The first terminals 21,41 of the first and second components 20,40, respectively, can have the same polarity. For instance, both the first terminals 21,41 can have a positive polarity or both the first terminals 21,41 can have a negative polarity. Therefore, the first transfer conductor 50 can direct electrical current from the first component 20 to the second component 40 in the first direction 1. Hence, the first terminal 21 of the first component 20 can correspond to an output terminal of the first component 20 and the first terminal 41 of the second component 40 can correspond to an input terminal of the second component 40. In an exemplary embodiment, the first component 20 is one of a high voltage source and a load and the second component 40 is the other one of the high voltage source and the load. In a non-limiting example, the high voltage source can provide voltages of 300 volts, wherein the first transfer conductor 50 directs 300 amps (e.g., 60 kW) of high electrical current from the high voltage source to the load.

Figure 2:
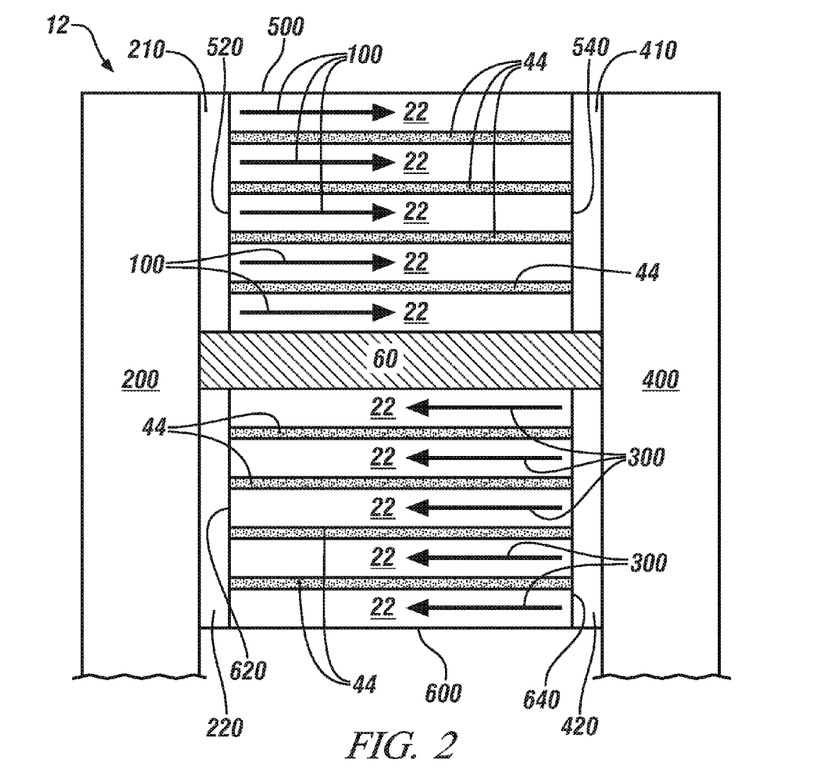
FIGS. 2 and 3 illustrate partial sectional views through an exemplary high current conducting apparatus including a first transfer conductor directing electric current in a first direction from a first component to a second component and a second transfer conductor directing electric current in a second direction from the second component to the first component in accordance with the present disclosure.

FIG. 2 illustrates a partial sectional view through an exemplary high current conducting apparatus 12 for transferring electrical current between a first component 200 and a second component 400. The apparatus 12 includes a first transfer conductor 500 and a second transfer conductor 600. The first transfer conductor 500 directs electrical current in a first direction 100 from the first component 200 to the second component 400. The second transfer conductor 600 directs electrical current in a second direction 300 from the second component 400 to the first component 200. The directed electric current in the second direction 300 is in a direction opposite to the directed electrical current in the first direction 100.

Each of the first and second transfer conductors 500,600, respectively, can include a plurality of overlapping conducting layers 22 each arranged in parallel with the directed electrical current in the first and second directions 100,300, respectively. Each of the first and second transfer conductors 500,600, respectively, can further include a plurality of insulation layers 44 each disposed between alternating ones of the conducting layers 22. As will become apparent, current density over the entire cross section of each of the conducting layers 22 is substantially uniform and the directed electrical current in the first and second directions 100,300, respectively, is evenly distributed across each of the conducting layers 22.

A first end 520 of the first transfer conductor 500 is electrically coupled to a first terminal 210 of the first component 200. A second end 540 of the first transfer conductor 500 is electrically coupled to a first terminal 410 of the second component 400. The respective first terminals 210,410 of the first and second components 200,400, respectively, can have the same polarity.

A first end 620 of the second transfer conductor 600 is electrically coupled to a second terminal 220 of the first component 200. A second end 640 of the second transfer conductor 600 is electrically coupled to a second terminal 420 of the second component 400. The respective second terminals 220,420 of the first and second components 200, 400, respectively, can have the same polarity.

In an exemplary embodiment, the second terminals 220, 420 have an opposite polarity than the polarity of the first terminals 210,410. For instance, when both the first terminals 210,410 have a positive polarity, both the second terminals 220,410 have a negative polarity. Therefore, the second transfer conductor 600 can direct electrical current from the second component 400 to the first component 200 in the second direction 300. Hence, the second terminal 420 of the second component 400 can correspond to an output terminal of the second component 400 and the second terminal 220 of the first component 200 can correspond to an input terminal of the first component 20. Similarly, the first transfer conductor 500 can direct electrical current from the first component 200 to the second component 400 in the first direction 100. Hence, the first terminal 210 of the first component 200 can correspond to an output terminal of the first component 200 and the first terminal 410 of second component 400 can correspond to an input terminal of the second component 400.

In an exemplary embodiment, the plurality of overlapping conducting layers 22 and the plurality of insulation layers 44 of the first transfer conductor 500 are each electrically coupled to the first terminal 210 of the first component 200 at the first end 520 and electrically coupled to the first terminal 410 of the second component 400 at the second end 540. Therefore, the electrical current is terminated at the first and second ends 520,540, respectively, of the first transfer conductor 500. Likewise, the plurality of overlapping conducting layers 22 and the plurality of insulation layers 44 of the second conductor 600 are each electrically coupled to the second terminal 220 of the first component 200 at the first end 620 and electrically coupled to the second terminal 420 of the second component 400 at the second end 640. Therefore, the electrical current is terminated at the first and second ends 620,640, respectively, of the second transfer conductor 600. It will be appreciated that the disclosure is not limited to any one specific scheme of electrically coupling the first transfer conductor 500 to each of the first and second components 200,400, respectively, and electrically coupling the second transfer conductor 600 to each of the first and second components 200,400, respectively.

As will become apparent, the directed electrical currents in the first and second directions 100,300, respectively, is uniformly distributed over each of the conducting layers 22 such that the current density over the cross sections of each of the conducting layers 22 is substantially uniform. A uniform current density over each of the conducting layers 22 negates the occurrence of any undesirable skin effect, or crowding of the electrical field at the surface of the transfer conductors 500,600 when the directed electrical current is an alternating current. A uniform current density over each of the conducting layers 22 reduces the voltage gradient and the temperature across the transfer conductors 500,600. Further, providing a plurality of substantially thin conducting layers provides less material, more flexibility and lower weight relative to a solid copper conductor (e.g., solid copper bus bar).

As illustrated in FIG. 2, the first and second transfer conductors 500,600, respectively, are arranged in parallel with the directed electrical currents in the first and second directions 100,300, respectively. In one embodiment, the first transfer conductor 500 overlies the second transfer conductor 600. However, other embodiments can include the first transfer conductor 500 underlying the second transfer conductor 600. A non-conducting layer 60 is disposed between the first and second transfer conductors 500,600, respectively, electrically isolating the first and second transfer conductors 500,600, respectively. The non-conducting layer 60 can be any dielectric material. In a non-limiting example, the non-conducting layer 60 is air.

The plurality of conducting layers 22 can include any material that is capable of providing conduction of an electrical current, and more specifically, a high alternating current. In a non-limiting example, the plurality of conducting layers can be copper, silver or aluminum. The insulating layers can include any material providing insulation. In a non-limiting example, insulating materials can include polyethylene, polystyrene quartz and polyfoam.

In the exemplary embodiments disclosed herein, when at least one transfer conductor (e.g., first and second transfer conductors 500,600, respectively) includes a plurality of overlapping conducting layers 22 each arranged in parallel with the directed electrical current (e.g., first and second directions 100,300, respectively) and a plurality of insulation layers 44 each disposed between alternating ones of the conducting layers 22, a wave propagated along the at least one transfer conductor at a velocity at or around a predetermined critical velocity will penetrate further into the transfer conductor (or completely through it) than it would penetrate into a solid conductor (e.g., slab of copper) of the same material. The penetration provided by the at least one transfer conductor results in a more uniform current distribution across the at least one transfer conductor than a solid conductor, wherein the directed electrical current penetrates through each of the plurality of the insulation layers 44 and the directed electrical current is uniformly distributed across each of the overlapping conducting layers 22. Hence, the at least one transfer conductor provides lower losses of the directed alternating current within the propagated wave. The predetermined critical velocity can be determined by the thickness of the plurality of conducting layers 22 and the plurality of insulation layers 44, and the dielectric constant of each of the insulation layers 44. Therefore, the thickness of each of the conducting layers 22 is substantially thin such that current density over the cross sections of each of the conducting layers 22 is substantially uniform. Accordingly, the directed electrical current (i.e., first and second directions 100,300, respectively) penetrates through each of the plurality of insulation layers 44 and the directed electric current is uniformly distributed across each of the conducting layers 22.

Embodiments herein are directed towards the first and second transfer conductors 500,600, respectively, configured to direct alternating current. However, the embodiments herein are similarly applicable to the first transfer conductor 50 illustrated in FIG. 1. A thickness of each of the conducting layers 22 is many times (e.g., 10, 100, or even 1,000 times) smaller than a factor, $\delta$, which is referred to herein as skin depth. Skin depth may be expressed as follows:

$$\delta = \sqrt{\frac{1}{\Pi f \mu \sigma}} \quad [1]$$

wherein δ is the skin depth expressed in meters,
f is the frequency in cycles per second,
μ is the permeability of the conducting layer 2, and
σ is the conductivity of the conducting layer in ohms per meter.

The skin depth, δ, measures the distance in which a directed electrical current or electric field penetrates into a solid conductor (e.g., slab of copper). The skin depth can be defined as the distance, measured from the surface of the solid conductor toward the interior of the solid conductor, where the current density is reduced to 1/e=0.367. The alternating current resistance of the conductor increases by the square root of the frequency when the skin depth, δ, is a fraction of the thickness of the solid conductor. As such, solid conductors transferring an alternating current can result in undesirable crowding of the electrical current or electric field near the surface of the solid conductor. It will be understood that thickness of each conducing and insulation layer 22,44, respectively, is measured in a direction transverse or perpendicular to the first and second directions 100,300, respectively.

Accordingly, the selected thickness of each conducting layer 22 becomes smaller and smaller fractions of the skin depth as the frequency increases. In other words, Eq. [1] demonstrates that thickness of each conducting layer 22 is selected based on an inversely proportional relationship to frequency of the directed electric current when the directed electric current is an alternating electric current. In one embodiment, the thickness of each conducting layer 22 is uniform. In another embodiment, the thickness of each conducting layer 22 may vary.

In an exemplary embodiment, a ratio of layer thickness of the conducting and insulation layers 22,44 respectively, can be selected. In one embodiment, a thickness of each of the conducting layers 22 is greater than a thickness of each of the insulation layers 44. In a frequency range where attenuation is substantially flat with frequency, an optimum ratio may be expressed as follows:

$$\frac{w}{t} = 2 \quad [2]$$

wherein w is the thickness of each conducting layers 22, and
t is the thickness of each insulation layer 44.

Hence, Eq. [2] demonstrates that the thickness of each insulation layer 44 is half the thickness of each conducting layer 22. At frequencies where the attenuation begins to increase, other selected ratios of w/t can be obtained, and the selected ratio will depend upon what top frequency through the transfer conductor is considered. Accordingly, this disclosure is not limited to the thickness of each conducting layer 22 being greater than the thickness of each insulation layer.

Further, providing the plurality of overlapping conducting layers 22 each arranged in parallel with the directed electrical current and the plurality of insulation layers 44 each disposed between alternating ones of the conducting layers 22 can reduce voltage spikes that are intensified in single conductors (e.g., copper busbar slab) due to a high inherent inductance because of the relatively long current pathway between various input and output terminals. Selecting a substantially thin thickness of each of the conducting layers 22 (and insulation layers 44) facilitates a substantially uniform current density over the cross sections of each of the conducting layers 22, thereby achieving a low voltage gradient across the entire transfer conductor (e.g., first and/or second transfer conductors 500,600), and thus, reducing voltage spikes.

Known conductors utilized within high voltage systems, such as hybrid electric and electric vehicles, include single solid conductors composed of copper that are thick, rigid and heavy, such as busbars and interconnects. These solid conductors that are thick, rigid and heavy are capable of transferring electrical current between various components of a high voltage system including at least one high voltage source such as a battery or fuel cell, a power inverter assembly, a radiator, an internal combustion engine, at least one electric machine and auxiliary components such as climate control systems, entertainment systems and power steering. Accordingly, these known single solid conductors can be replaced by the at least one transfer conductor including the plurality of overlapping conducting layers each arranged in parallel with the directed electrical current and the plurality of insulation layers each disposed between alternating ones of the conducting layers, to thereby provide a highly flexible means of conducting electrical current due to each conducting and insulation layer being substantially thin as opposed to the single solid conductor. Additionally, providing a plurality of substantially thin conducting and insulation layers can reduce the cost compared to the cost of single conductors such as copper or tin-plated copper busbars. As aforementioned, the plurality of substantially thin conducting and insulation layers also eliminates crowding of electrical fields near the surface, as is common with single solid conductors.

Figure 3:
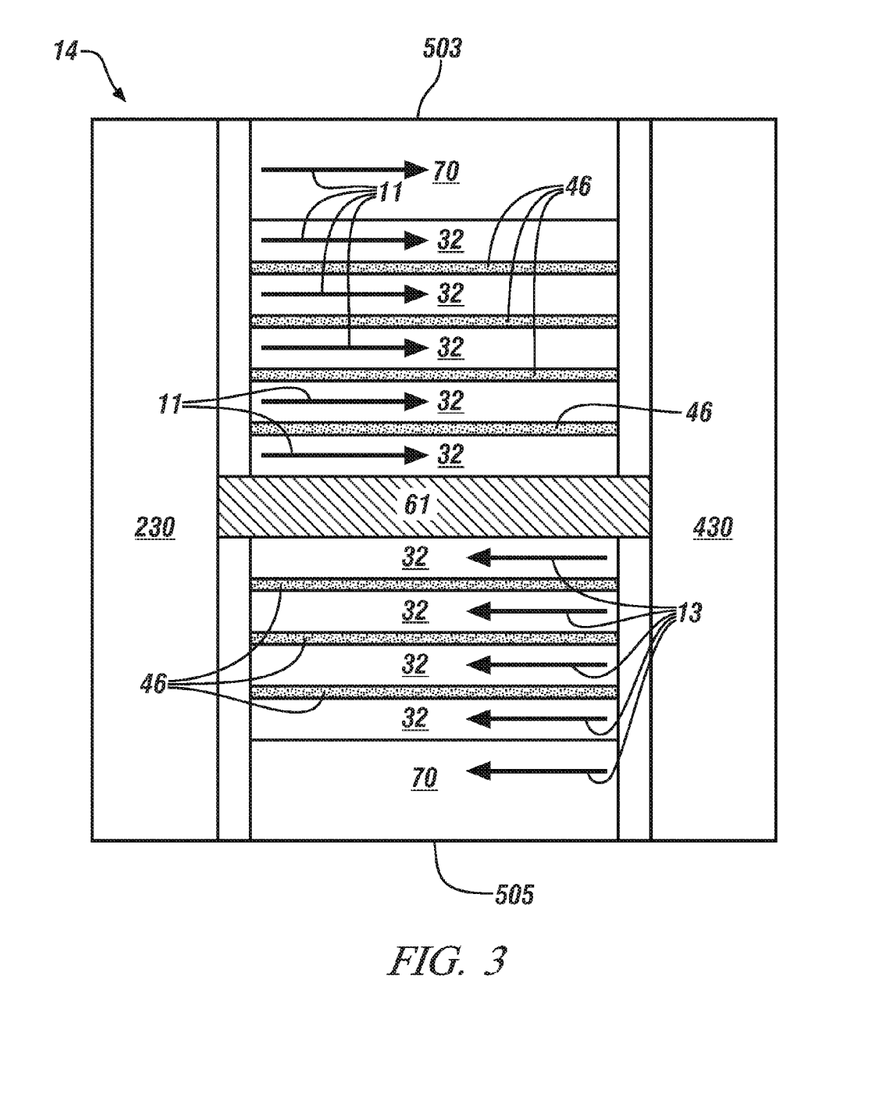

FIG. 3 illustrates a partial sectional view through an exemplary high current conducting apparatus 14 for transferring electrical current between a first component 230 and a second component 430. The apparatus 14 includes a first transfer conductor 503 directing electrical current in a first direction 11 from the first component 230 to the second component 430. The first transfer conductor 503 is a first hybrid transfer conductor directing both direct and alternating currents from one of a voltage source (e.g., first components 230) and a load to the other one of the high voltage source and the load (e.g., second component 430).

Similar to the transfer conductors 50, 500 and 600 illustrated in FIGS. 1 and 2, the first hybrid transfer conductor (i.e., first transfer conductor 503) illustrated in FIG. 3 includes a plurality of overlapping conducting layers 32 each arranged in parallel with the directed electrical current and a plurality of insulation layers 46 each disposed between alternating ones of the conducting layers 32. The plurality of overlapping conducting layers 32 can be configured to direct an alternating current in the first direction 11 from the first component 230 to the second component 430.

The first hybrid transfer conductor (i.e., first transfer conductor 503) further includes a solid conductor 70 directing electrical current in the first direction 11 from the first component 230 to the second component 430. The solid conductor 70 and the plurality of overlapping conducting layers 32 are arranged in parallel with the first direction 11. Specifically, the solid conductor 70 is adjacent to the plurality of overlapping conducting layers 32 and one of overlying and underlying the plurality of overlapping conducting layers. The solid conductor 70 can be configured to direct a direct current in the first direction 11 from the first component 230 to the second component 430. A thickness of the solid conductor 70 is greater than the thickness of each of the conducting layers 32. It will be appreciated that the skin effect phenomenon does not occur along the solid conductor 70 because the solid conductor is directing a direct current. Hence, the directed current is uniformly distributed across the solid conductor, and therefore, the current density across the solid conductor is substantially uniform.

In another exemplary embodiment, the apparatus 14 including the first hybrid transfer conductor (i.e., first transfer conductor 503) can be applicable to embodiments substantially similar to the first and second transfer conductors 500,600, respectively, illustrated in FIG. 2, wherein there is the first hybrid transfer conductor (i.e., first transfer conductor 503) directing electrical current in the first direction from the first component 230 to the second component 430 and a second hybrid transfer conductor (i.e., second transfer conductor 505) directing electrical current in a second direction 13 from the second component 430 to the first component 230. It will be understood that the second hybrid transfer conductor 505 includes the solid conductor 70 for directing a direct current in the second direction 13 and the plurality of overlapping conducting layers 32 for directing an alternating current in the second direction 13. As such, the solid conductor 70 of the second hybrid transfer conductor 505 is adjacent to—and one of underlies and overlies—the plurality of overlapping conducting layers 32. In an exemplary embodiment, the solid conductors 70 of the first and second hybrid conductors 503,505, respectively, are adjacent to their respective plurality of overlapping conducting layers 32 on a side opposite to a non-conducting layer 61. The non-conducting layer 61 electrically isolates the first and second hybrid transfer conductors 503,505, respectively, and can include any dielectric material. In a non limiting example, the non-conducting layer 61 includes air as the dielectric material.

Figure 4:
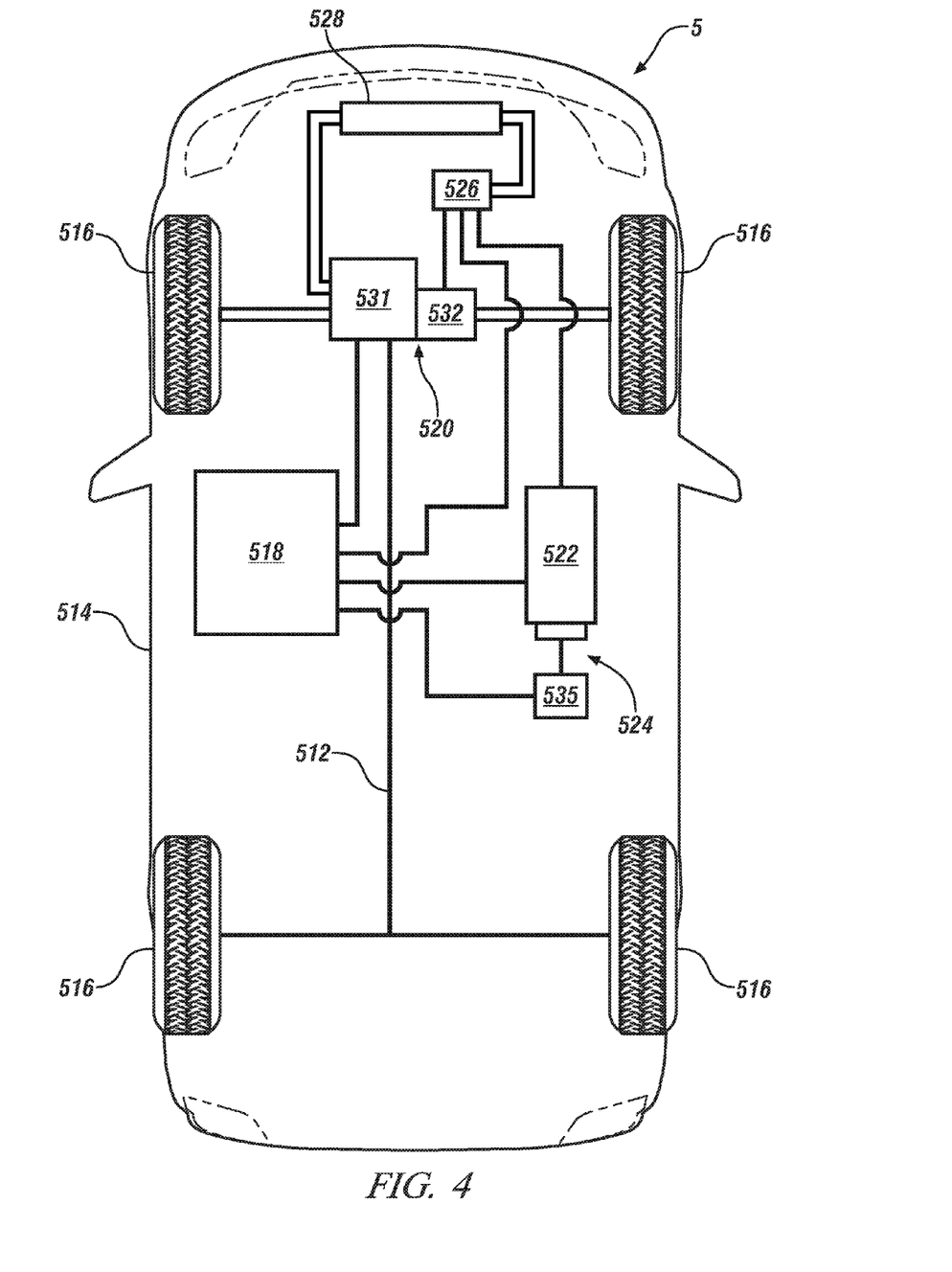
FIG. 4 illustrates a schematic view of an exemplary vehicle in accordance with the present disclosure.

FIG. 4 illustrates a vehicle 5 in an exemplary embodiment of the present disclosure. Vehicle 5 includes a chassis 512, a body 514, four wheels 516, and an electronic control system (ECU) 518. The body 514 is arranged on the chassis 512 and substantially encloses the other components of the vehicle 5. The body 514 and the chassis 512 may jointly form a frame. The wheels 516 are each rotationally coupled to the chassis 512 near a respective corner of the body 514.

The exemplary vehicle 5 can incorporate any one of, or combination of, a number of different types of engines or actuators, such as a gasoline or diesel fueled combustion engine, a flex fuel vehicle using a mixture of gasoline and alcohol, a gaseous compound fueled engine such as hydrogen and/or natural gas or a fuel cell. The vehicle can be a hybrid electric vehicle incorporating any one, or combination, of the above engines or actuators and at least one electric machine operative for providing motive torque and generating electrical energy during periods of regeneration. The vehicle 5 can also be an electric vehicle incorporating one or more electric machines.

In the exemplary embodiment illustrated in FIG. 4, vehicle 5 is a hybrid vehicle that further includes a powertrain 520, at least one electrical energy storage device (ESD) 522, a battery state of charge (SOC) system 524, a power inverter assembly 526, a state of charge (SOC) module 535, a radiator 528 and at least one accessory component such as a climate control system powered by the at least one electrical energy storage device 522. The powertrain 520 suitably includes an internal combustion engine 531 and at least one electric machine 532. The ESD 522 can include a battery that is electrically connected to the power inverter assembly 526 and, in one embodiment, is a lithium ion (Li-ion) high-voltage battery including any number of battery packs, battery modules and cells, as is commonly used. In another embodiment, the at least one ESD can include a low voltage battery. The exemplary transfer conductors 50,500,503,505,600 can be utilized to direct high electrical current between the various components of the powertrain as needed. Specifically, at least one transfer conductor directs a high electrical current in a first direction from a voltage source to a load. More specifically, the at least one transfer conductor directing a high alternating current across a plurality of overlapping conducting layers each arranged in parallel with the directed high alternating current and a plurality of insulation layers each disposed between alternating ones of the conducting layers, wherein current density over the cross sections of each of the conducting layers is substantially uniform. In embodiments where the at least one transfer conductor is a hybrid transfer conductor, a high direct current can additionally be directed across a solid conductor having a thickness greater than a thickness of each of the plurality of overlapping conducting layers, the solid conductor and the plurality of overlapping layers arranged in parallel and the solid conductor one of overlying and underlying the plurality of overlapping conducting layers.

It will be appreciated that FIGS. 1 and 2 illustrate apparatuses 10, 12,14 for transferring a high electrical current between the first component 20,200,230 and the second component 40,400,430. For simplicity, the apparatus 12 disclosed in FIG. 2 will be referred to herein. As aforementioned, exemplary embodiments can include the first component 200 including one of a high voltage source and a load and the second component 400 including the other one of the high voltage source and the load. In a non-limiting example, the high voltage source can provide voltages of 300 volts, wherein the at least one transfer conductor 500 or 600 directs 300 amps (e.g., 60 kW) of high alternating electrical current from the high voltage source to the load.

In one exemplary embodiment, the first component 200 is a power module of a power inverter assembly and the second component 400 is a multi-phase electrical machine. In non-limiting examples, the multi-phase electrical machine can include a multi-phase permanent magnet electrical machine, an induction machine or a wounded rotor synchronous machine. The power module converts a direct current received from a high voltage source (e.g., battery pack) to a single phase alternating current. The first transfer conductor 500 directs the single phase alternating current received from the power module to drive the multi-phase electrical machine. It will be appreciated, that the power inverter assembly can include multiple power modules each capable of converting the direct current received from the high voltage source to a single phase alternating current, wherein each single phase alternating current is directed to the multi-phase electric machine via a respective transfer conductor 500. Hence, the first transfer conductor directs the single phase alternating current in a first direction from the power module (i.e., first component 200) to the multi-phase electric machine (i.e., second component 400). In an exemplary embodiment, the transfer conductor 500 is a stator winding.

Further, the multi-phase electrical machine can operate as a generator wherein the power module converts a single phase alternating current to a direct current, via rectification, received from the multi-phase electrical machine to charge a high voltage source (e.g., battery pack or fuel cell). For instance, the multi-phase electrical machine can operate as the generator during periods of regenerative braking in a hybrid or electric vehicle. Referring to FIG. 2, the single phase alternating current received from the multi-phase electrical machine is directed via the second transfer conductor 600. The non-conducting layer 60 including a dielectric material disposed between the first and second transfer conductors 500,600, respectively, electrically isolates the first and second transfer conductors 500,600, respectively. In an exemplary embodiment, the second transfer conductor 600 is a stator winding.

Exemplary embodiments can include the first and second components selected from the group consisting of: at least one electrical energy storage device, battery packs, battery modules, battery cells, charging receptacles and auxiliary components.

In another exemplary embodiment, the first component 200 is an electrical energy storage device and the second component 400 is an auxiliary component. Electrical energy storage devices can include batteries and fuel cells. In one embodiment, the electrical energy storage device is a high voltage battery that is nominally in the range of 300 V and includes several cell modules. In one embodiment, each battery module of the high voltage battery includes several individual battery cells. In another embodiment, the electrical energy storage device can include a low voltage battery that is nominally in the range of 12 V and 14 V. Auxiliary components can include, but are not limited to, a climate control system, electronic actuators utilized in power windows and door locks and an entertainment system of a vehicle. In an exemplary embodiment, the electrical energy storage device supplies energy to the auxiliary component that may include operation of a climate control system. The auxiliary component may be supplied energy in multiple phases. The supplied energy from the electrical energy storage device to the auxiliary component is directed as an electrical current via the at least one transfer conductor 500.

In another exemplary embodiment, the first component 200 is a first electrical energy storage device and the second component 400 is a second electrical energy storage device. In one embodiment, the first and second electrical energy storage devices can each include high voltage battery packs. In a non-limiting example, the first transfer conductor 500 directs electrical current supplied from the first high voltage battery pack in a first direction to the second high voltage battery pack. Likewise, the second transfer conductor 600 directs electrical current supplied from the second high voltage battery pack in a second direction to the first high voltage battery pack. In another embodiment, the first electrical energy storage device can include a low voltage battery (e.g., 12V or 14V) and the second electrical energy storage device can include a high voltage battery (e.g., 300 V). In a non-limiting example, voltage conversion can be provided between the low voltage battery and the high voltage battery via one or both of the first and second transfer conductors 500,600, respectively.

In yet another exemplary embodiment of the present disclosure, the first component 200 is a first component of an electrical energy storage device and the second component 400 is a second component of the electrical energy storage device. In one embodiment, the first component of the electrical energy storage device is a charging receptacle and the second component of the electrical energy storage device is a battery module, wherein an external power source can be attached to the charging receptacle for charging the battery module. In a non-limiting example, the at least one transfer conductor 500 or 600 directs an electrical current received from the charging receptacle for charging the battery module. The battery module can be one of a plurality of battery modules within a battery pack. In another non-limiting example, the first component of the electrical energy storage device is a first battery module and the second component of the electrical energy storage device is a second battery module. At least one transfer conductor 500 and/or 600 directs energy between the first and second battery modules. In another non-limiting example, the first component of the electrical energy storage device is a first battery cell and the second component of the electrical energy storage device is a second battery cell. At least one transfer conductor 500, 503, 505 and/or 600 directs energy between the first and second battery cells.

It will be appreciated that the apparatuses of FIGS. 1-3 are not limited to the above embodiments and can include any bus, busbar, interconnection or other conductor where a high electric current is transferred from a voltage source to a load within a hybrid electric or electric vehicle.

Figure 5:
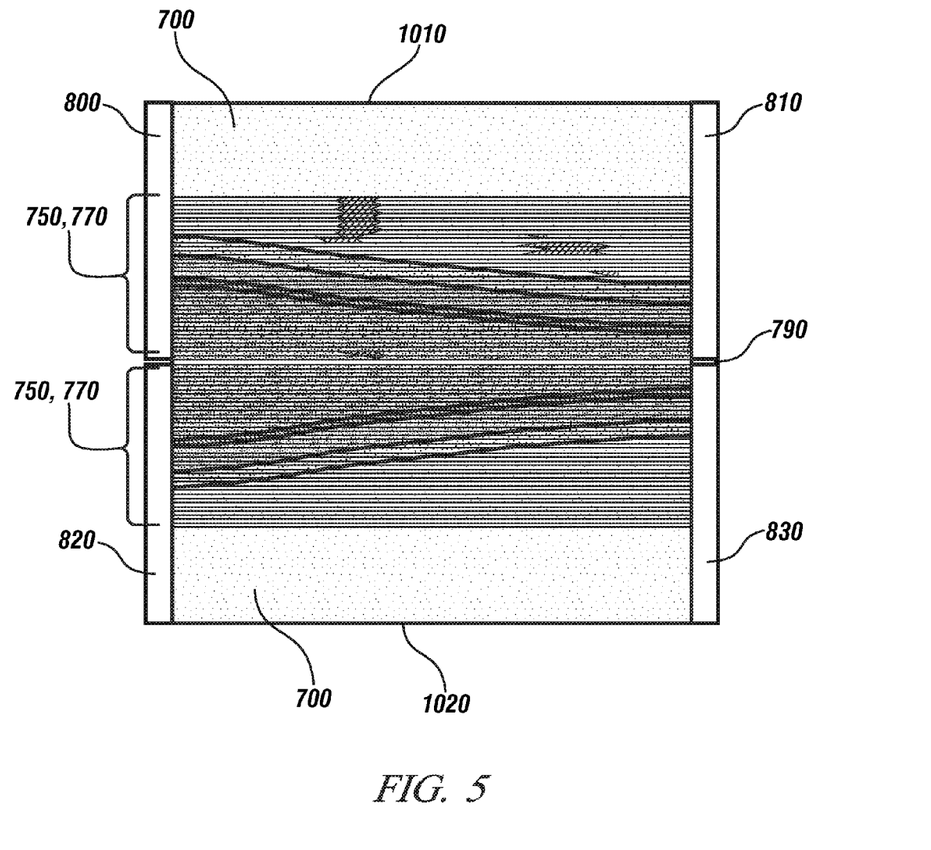
FIG. 5 illustrates test data of current distribution across first and second hybrid transfer conductors in accordance with the present disclosure.

FIG. 5 illustrates test data of current distribution across first and second hybrid transfer conductors 1010,1020, respectively, each including a solid conductor 700, a plurality of overlapping conducting layers 750 each arranged in parallel with a directed electrical current and a plurality of insulation layers 770 each disposed between alternating ones of the conducting layers 750. The first hybrid transfer conductor 1010 directs electrical current at 300 Amps from a first high-voltage source 800 to a first load 810. The second hybrid transfer conductor 1020 directs electrical current at 300 Amps from a second high-voltage source 820 for a second load 830. The directed electrical currents transferred along the first and second hybrid transfer conductors 1010, 1020, respectively. A non-conducting layer 790 that includes air electrically isolates the first and second hybrid transfer conductors 1010,1020, respectively. The plurality of overlapping conducting layers 750 and the plurality of insulation layers 770 each disposed between alternating ones of the conducting layers 750 direct an alternating current at 1 kilohertz. Each of the solid conductors 700 are adjacent to the plurality of overlapping conducting layers 750 and the plurality of insulation layers 770 on a side opposite the non-conducting layer 790. The solid conductors 700 direct a direct current. The length of each of the first and second hybrid transfer conductors 1010,1020, respectively, is 5 mm. The thickness of each of the first and second hybrid transfer conductors 1010,1020, respectively, is 5 mm.

The exemplary test data illustrated in FIG. 5 illustrates current distribution along each of the first and second hybrid transfer conductors 1010, 1020, respectively. The darker the shading demonstrates a higher current density. The directed electric current across the plurality of overlapping conducting layers 750 and the plurality of insulation layers 770 becomes evenly distributed as the current is transferred from each of the first and second high voltage sources 800,820, respectively, to respective ones of the first and second loads 810,830, respectively. Hence, the current density becomes substantially uniform across the plurality of overlapping conducting layers 750 and the plurality of insulation layers 770 from left to right, thereby eliminating any skin effect from the alternating current. It will be appreciated if the length of the first and second hybrid transfer conductors 1010,1020, respectively, was longer, the current density would substantially normalize. Because the solid conductors 700 transfer a direct current, skin effect does not occur, and hence, the current density and current distribution is always uniform.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An alternating current electrical conductor for conducting alternating current between first and second opposite ends of the conductor, comprising:
  a plurality of electrically conductive layers, each conductive layer separated from adjacent conductive layers by a respective insulating layer;
  all conductive layers coupled to a common first terminal at the first end of the conductor;
  all conductive layers coupled to a common second terminal at the second end of the conductor;
  whereby current can only flow through all conductive layers in one direction between the first and second ends of the conductor at any given time;
  all conductive layers comprising a thickness that is many times smaller than a factor of skin depth ($\delta$), wherein:

$$\delta = \sqrt{\frac{1}{\pi f \mu \sigma}},$$

and wherein
  f is the alternating current frequency,
  $\mu$ is the permeability of the conductive layer, and
  $\sigma$ is the conductivity of the conductive layer.

2. The alternating current electrical conductor of claim 1 wherein the thickness of each of the conducting layers is uniform.

3. The alternating current electrical conductor of claim 1 wherein the thickness of each of the conducting layers is greater than a thickness of each of the insulation layers.

4. The alternating current electrical conductor as claimed in claim 1, wherein each insulating layer comprises a thickness greater than the thickness of each conductive layer.

5. A vehicle powertrain, comprising:
  an electrical energy storage device;
  an alternating current electric machine;
  a power inverter assembly coupled between the electrical energy storage device and the alternating current machine;
  an alternating current electrical conductor for conducting alternating current between the alternating current electrical machine at a first terminal and the power inverter assembly at a second terminal, comprising:
    a plurality of electrically conductive layers, each conductive layer separated from adjacent conductive layers by a respective insulating layer;
    all conductive layers comprising first and second opposite ends, said first end of all conductive layers coupled to said first terminal and said second end of all conductive layers coupled to said second terminal;
    whereby current can only flow through all conductive layers in one direction between the first and second ends of the conductor at any given time;
    all conductive layers comprising a thickness that is many times smaller than a factor of skin depth ($\delta$), wherein:

$$\delta = \sqrt{\frac{1}{\pi f \mu \sigma}},$$

and wherein
    f is the alternating current frequency,
    $\mu$ is the permeability of the conductive layer, and
    $\sigma$ is the conductivity of the conductive layer.

6. The vehicle powertrain as claimed in claim 5, wherein each conductive layer comprises a thickness greater than the thickness of each conductive layer.

7. The vehicle powertrain as claimed in claim 5 wherein the thickness of each of the conducting layers is uniform.

8. The vehicle powertrain as claimed in claim 5 wherein the thickness of each of the conducting layers is greater than a thickness of each of the insulation layers.

9. The vehicle powertrain as claimed in claim 5, further comprising a direct current electrical conductor for conducting direct current one of overlying and underlying the plurality of electrically conductive layers of said alternating current conductor.

10. The alternating current electrical conductor of claim 1 wherein the thickness of each of the conducting layers varies.

11. The vehicle powertrain as claimed of claim 5 wherein the thickness of each of the conducting layers varies.

12. The alternating current electrical conductor of claim 3 wherein the thickness of the conducting layers is twice the thickness of the insulating layers.

13. The alternating current electrical conductor of claim 8 wherein the thickness of the conducting layers is twice the thickness of the insulating layers.

* * * * *